(12) United States Patent
Chen (10) Patent No.: US 10,509,494 B2
(45) Date of Patent: Dec. 17, 2019

(54) TOUCH CONTROL ELECTRODE AND MANUFACTURE METHOD THEREOF (71) Applicant: Wuhan China Star Optoelectronics Technology Co., Ltd., Wuhan (CN)

(72) Inventor: Caiqin Chen, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 384 days.

(21) Appl. No.: 15/505,113

(22) PCT Filed: Dec. 29, 2016

(86) PCT No.: PCT/CN2016/113022
§ 371 (c)(1),
(2) Date: Feb. 20, 2017

(87) PCT Pub. No.: WO2018/119881
PCT Pub. Date: Jul. 5, 2018

(65) Prior Publication Data
US 2019/0155427 A1    May 23, 2019

(30) Foreign Application Priority Data
Dec. 26, 2016 (CN) .......................... 2016 1 1215235

(51) Int. Cl.
G06F 3/041    (2006.01)
G06F 3/044    (2006.01)

(52) U.S. Cl.
CPC ............ *G06F 3/0412* (2013.01); *G06F 3/044* (2013.01); *G06F 3/0418* (2013.01); *G06F 2203/04103* (2013.01); *G06F 2203/04104* (2013.01); *G06F 2203/04111* (2013.01)

(58) Field of Classification Search
CPC ...... G06F 3/0412; G06F 3/0418; G06F 3/044; G06F 3/0444; G06F 3/0446; G06F 2203/04103; G06F 2203/04104; G06F 2203/04111
See application file for complete search history.

(56) References Cited

U.S. PATENT DOCUMENTS

2009/0242283 A1* 10/2009 Chiu .................... G06F 3/044
                                                178/20.01
2012/0050186 A1*  3/2012 Yi ......................... G06F 3/044
                                                   345/173

(Continued)

FOREIGN PATENT DOCUMENTS

CN    102193669 A    9/2011

*Primary Examiner* — Tom V Sheng
(74) *Attorney, Agent, or Firm* — Leong C. Lei (57) ABSTRACT The present invention provides a touch control electrode and a manufacture method thereof. Only the second electrode (12) is covered with an insulation layer (13) in the touch control electrode, and the first electrode (11) is not covered with the insulation layer to ensure that a lateral capacitance variable and a fringing field capacitance variable are generated as being touched while the bridging line (112) and the second electrode (12) are insulated, and thus to increase the total capacitance variable as being touched, to promote the signal to noise ratio, and the touch result is better.

13 Claims, 6 Drawing Sheets providing a substrate (10), and depositing and patterning a conductive material on the substrate (10) to obtain a plurality of first electrodes (11) which are arranged in parallel with one another and extended along a horizontal direction, and a plurality of second electrodes (12) which are arranged in parallel with one another and extended along a vertical direction, and each of the first electrodes (11) being divided into a plurality of first sub electrodes (111) which are separated with one another by the plurality of second electrodes (12);    ⟋1 depositing an insulation material on the first electrodes (11), the second electrodes (12) and the substrate (10), and patterning the insulation material, and removing the insulation material on the first electrodes (11) and the substrate (10) to obtain an insulation layer (13) covering on the second electrodes (12);    ⟋2 manufacturing a bridging line (112) between first sub electrodes (111) which are adjacent on the same first electrode (11), and the bridging line (112) being across the second electrode (12) between the first sub electrodes (111) which are adjacent to electrically connect the first sub electrodes (111) which are adjacent, and the bridging line (112) being insulated with the second electrode (12) by the insulation layer (13).    ⟋3

(56) References Cited

U.S. PATENT DOCUMENTS

| | | | |
|---|---|---|---|
| 2012/0139871 A1* | 6/2012 | Ku | G06F 3/044 345/174 |
| 2012/0146942 A1* | 6/2012 | Kamoshida | G06F 3/044 345/174 |
| 2012/0268402 A1* | 10/2012 | Wang | G06F 3/041 345/173 |
| 2014/0027264 A1* | 1/2014 | Chiu | H03K 17/962 200/600 |
| 2014/0062912 A1* | 3/2014 | Lien | G06F 3/0412 345/173 |
| 2014/0182888 A1* | 7/2014 | Chuang | H05K 1/0274 174/251 |
| 2014/0345910 A1* | 11/2014 | Wang | G06F 3/044 174/251 |
| 2015/0062060 A1* | 3/2015 | Kim | G06F 3/044 345/174 |
| 2015/0236047 A1* | 8/2015 | Kim | H01L 27/124 345/174 |
| 2015/0253917 A1* | 9/2015 | Fan | G06F 3/044 345/173 |
| 2015/0268761 A1* | 9/2015 | Yang | G06F 3/044 345/174 |
| 2015/0277623 A1* | 10/2015 | Nakamura | G06F 3/044 345/174 |
| 2015/0309605 A1* | 10/2015 | Hsu | G06F 3/044 345/173 |
| 2016/0048238 A1* | 2/2016 | Qu | G06F 3/044 345/174 |
| 2016/0103519 A1* | 4/2016 | Zeng | G06F 3/044 345/174 |
| 2016/0162070 A1* | 6/2016 | He | G06F 3/044 345/174 |
| 2016/0328039 A1* | 11/2016 | Lin | G06F 3/044 |
| 2016/0370939 A1* | 12/2016 | Guo | G06F 3/0418 |
| 2017/0068365 A1* | 3/2017 | Liu | G06F 3/0412 |
| 2017/0083142 A1* | 3/2017 | Wang | G06F 3/044 |
| 2017/0108975 A1* | 4/2017 | Zhang | G06F 3/044 |
| 2017/0277308 A1* | 9/2017 | Zeng | G06F 3/044 |
| 2018/0081471 A1* | 3/2018 | Qu | G06F 3/0412 |
| 2018/0196561 A1* | 7/2018 | Kim | G06F 3/044 |
| 2018/0210576 A1* | 7/2018 | Zhang | G06F 3/044 |
| 2018/0341348 A1* | 11/2018 | Zeng | G06F 3/044 |

* cited by examiner providing a substrate (10), and depositing and patterning a conductive material on the substrate (10) to obtain a plurality of first electrodes (11) which are arranged in parallel with one another and extended along a horizontal direction, and a plurality of second electrodes (12) which are arranged in parallel with one another and extended along a vertical direction, and each of the first electrodes (11) being divided into a plurality of first sub electrodes (111) which are separated with one another by the plurality of second electrodes (12);  —1 depositing an insulation material on the first electrodes (11), the second electrodes (12) and the substrate (10), and patterning the insulation material, and removing the insulation material on the first electrodes (11) and the substrate (10) to obtain an insulation layer (13) covering on the second electrodes (12);  —2 manufacturing a bridging line (112) between first sub electrodes (111) which are adjacent on the same first electrode (11), and the bridging line (112) being across the second electrode (12) between the first sub electrodes (111) which are adjacent to electrically connect the first sub electrodes (111) which are adjacent, and the bridging line (112) being insulated with the second electrode (12) by the insulation layer (13).  —3

TOUCH CONTROL ELECTRODE AND MANUFACTURE METHOD THEREOF

FIELD OF THE INVENTION

The present invention relates to a display technology field, and more particularly to a touch control electrode and a manufacture method thereof.

BACKGROUND OF THE INVENTION

With the development of display technology, the flat panel device, such as Liquid Crystal Display (LCD) possesses advantages of high image quality, power saving, thin body and wide application scope. Thus, it has been widely applied in various consumer electrical products, such as mobile phone, television, personal digital assistant, digital camera, notebook, laptop, and becomes the major display device.

Touch panel provides a new human machine interactive interface. The usage is more direct and with more humanization. Forming a touch control device with combining the touch panel and the flat display device is capable of providing the touch control function to the flat display device. With the fingers, the stylus for inputting, the operation can be more intuitive and easy.

The touch control display panels can be categorized into four types of resistive, capacitive, optics, surface acoustic wave types according to sensing technology. At present, the main stream touch control technology is the capacitive type. The capacitive type can be further categorized into self capacitive type and mutual capacitive type. The main capacitive type touch control display panel in the present market is the mutual capacitive type, and the advantage of the mutual capacitive type is being able to achieve multi-touch control. According to the difference of the structures, the touch control display panels can be categorized: the touch control circuit covering on cell (On Cell), the touch control circuit embedded in cell (In Cell) and Out Cell. The In Cell type possesses advantages of low cost, being ultra thin and narrow frame, which is mainly applied in the high end touch control product. However, the process difficulty of the In Cell type touch control technology is higher, and the factor of signal interference exists, and the sensitivity is worse. The Out Cell type is applied for most of the touch control display panels in the present market. The advantages of the Out Cell type are high sensitivity and fast response speed. The drawbacks are high cost and restriction for the ultra-thin product. The On cell type integrates the advantages of the Out Cell type and the In Cell type, and can promote the sensitivity and decrease the panel thickness, too.

In prior art, the On cell type touch control display panel generally comprises: a first Indium Tin Oxides (ITO) layer, an insulation layer covering on the ITO layer and a bridging layer located on the insulation layer. The first ITO layer is formed with a plurality of driving electrodes and a plurality of sensing electrodes. The plurality of the sensing electrodes are connected by the ITO connecting lines in the same layer, and the plurality of driving electrodes are connected by the bridging lines in the bridging layer through the vias of the insulation layer. In the touch control display of such structure, the insulation layer completely covers on the first ITO layer except the via area. As being touched, the total capacitance change is smaller, which results in the low signal to noise of the touch control display panel, and the touch result is poor.

SUMMARY OF THE INVENTION

An objective of the present invention is to provide a touch control electrode, which can promote the signal to noise ratio of the touch control panel, and improve the touch control result.

Another objective of the present invention is to provide a manufacture method of a touch control electrode, which can promote the signal to noise ratio of the touch control panel, and improve the touch control result.

For realizing the aforesaid objectives, the present invention provides a touch control electrode, comprising: a plurality of first electrodes which are arranged in parallel with one another and extended along a horizontal direction, and a plurality of second electrodes which are arranged in parallel with one another and extended along a vertical direction;

the plurality of first electrodes and the plurality of second electrodes are located in the same layer, and each of the first electrodes are divided into a plurality of first sub electrodes which are separated with one another by the plurality of second electrodes, and the first sub electrodes which are adjacent on the same first electrode are electrically connected with a bridging line across the second electrode between the two first sub electrodes;

the plurality of second electrodes are covered with an insulation layer, and the bridging line is insulated with the second electrode by the insulation layer.

Each of the second electrodes comprises a plurality of second sub electrodes which are sequentially arranged in a vertical direction, and a plurality of connecting lines seriesly connecting the respective second electrodes;

the second sub electrode and the first sub electrode are staggered, and the connecting line and the bridging line are insulated and crossed.

Both shapes of the second sub electrode and the first sub electrode are rectangles.

Materials of the second sub electrode, the first sub electrode, the bridging line and the connecting line are indium tin oxide.

The first electrode is a driving electrode, and the second electrode is a sensing electrode.

The present invention further provides a manufacture method of a touch control electrode, comprising steps of:

step 1, providing a substrate, and depositing and patterning a conductive material on the substrate to obtain a plurality of first electrodes which are arranged in parallel with one another and extended along a horizontal direction, and a plurality of second electrodes which are arranged in parallel with one another and extended along a vertical direction, and each of the first electrodes being divided into a plurality of first sub electrodes which are separated with one another by the plurality of second electrodes;

step 2, depositing an insulation material on the first electrodes, the second electrodes and the substrate, and patterning the insulation material, and removing the insulation material on the first electrodes and the substrate to obtain an insulation layer covering on the second electrodes;

step 3, manufacturing a bridging line between first sub electrodes which are adjacent on the same first electrode, and the bridging line being across the second electrode between the first sub electrodes which are adjacent to electrically connect the first sub electrodes which are adjacent, and the bridging line being insulated with the second electrode by the insulation layer.

Each of the second electrodes comprises a plurality of second sub electrodes which are sequentially arranged in a vertical direction, and a plurality of connecting lines seriesly connecting the respective second electrodes;
the second sub electrode and the first sub electrode are staggered, and the connecting line and the bridging line are insulated and crossed.
Both shapes of the second sub electrode and the first sub electrode are rectangles.
Materials of the second sub electrode, the first sub electrode, the bridging line and the connecting line are indium tin oxide.
The first electrode is a driving electrode, and the second electrode is a sensing electrode.
The present invention further provides a manufacture method of a touch control electrode, comprising steps of:
step 1, providing a substrate, and depositing and patterning a conductive material on the substrate to obtain a plurality of first electrodes which are arranged in parallel with one another and extended along a horizontal direction, and a plurality of second electrodes which are arranged in parallel with one another and extended along a vertical direction, and each of the first electrodes being divided into a plurality of first sub electrodes which are separated with one another by the plurality of second electrodes;
step 2, depositing an insulation material on the first electrodes, the second electrodes and the substrate, and patterning the insulation material, and removing the insulation material on the first electrodes and the substrate to obtain an insulation layer covering on the second electrodes;
step 3, manufacturing a bridging line between first sub electrodes which are adjacent on the same first electrode, and the bridging line being across the second electrode between the first sub electrodes which are adjacent to electrically connect the first sub electrodes which are adjacent, and the bridging line being insulated with the second electrode by the insulation layer;
wherein each of the second electrodes comprises a plurality of second sub electrodes which are sequentially arranged in a vertical direction, and a plurality of connecting lines seriesly connecting the respective second electrodes;
the second sub electrode and the first sub electrode are staggered, and the connecting line and the bridging line are insulated and crossed;
wherein the first electrode is a driving electrode, and the second electrode is a sensing electrode.

The benefits of the present invention are: the present invention provides a touch control electrode. Only the second electrode is covered with an insulation layer in the touch control electrode, and the first electrode is not covered with the insulation layer to ensure that a lateral capacitance variable and a fringing field capacitance variable are generated as being touched while the bridging line and the second electrode are insulated, and thus to increase the total capacitance variable as being touched, to promote the signal to noise ratio, and the touch result is better. The present invention further provides a manufacture method of a touch control electrode, which can promote the signal to noise ratio of the touch control panel, and improve the touch control result.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 4:
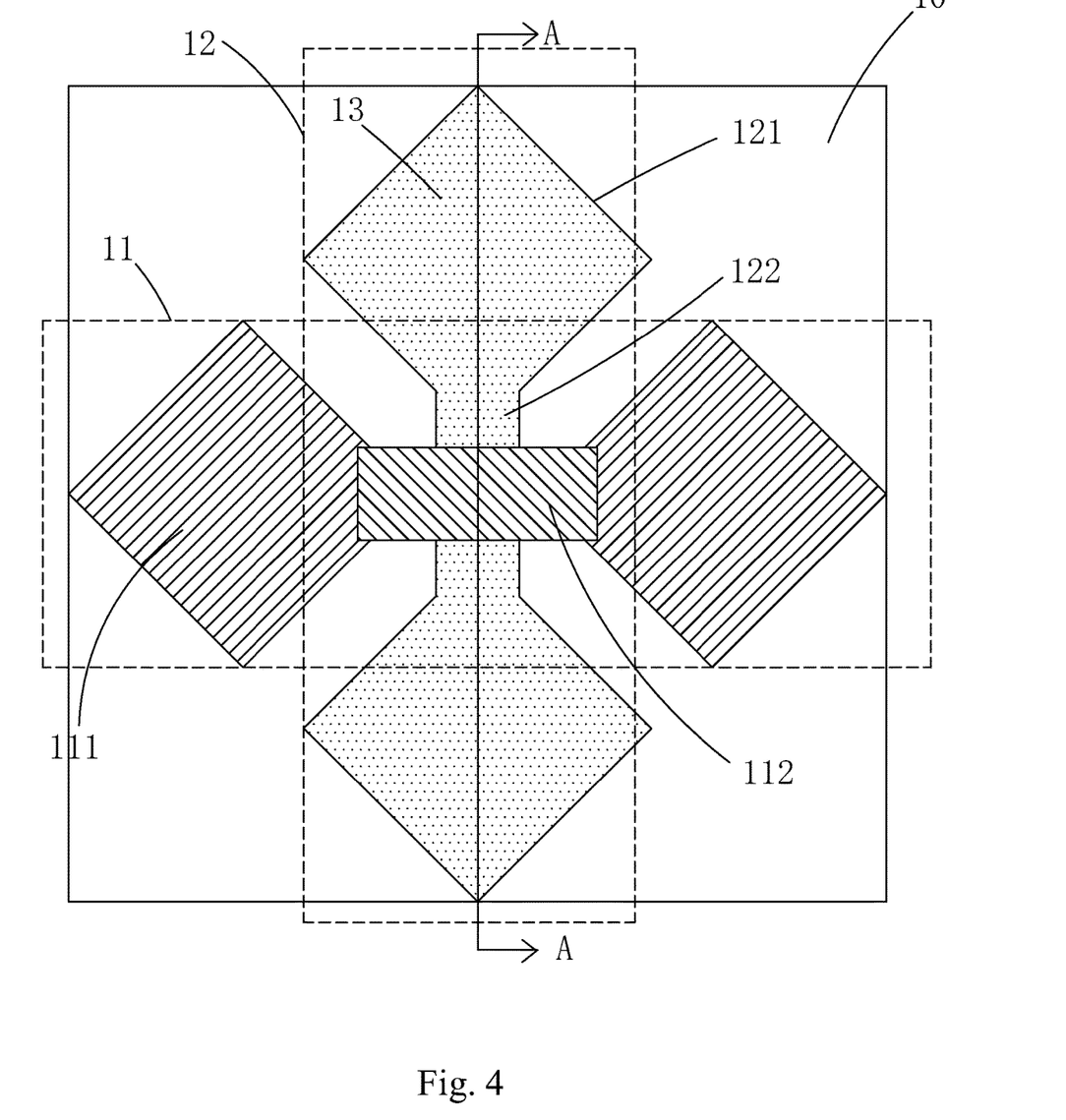
FIG. 4 is a diagram of step 3 of a manufacture method of a touch control electrode of the present invention and also a top view diagram of a touch control electrode of the present invention.
Figure 5:
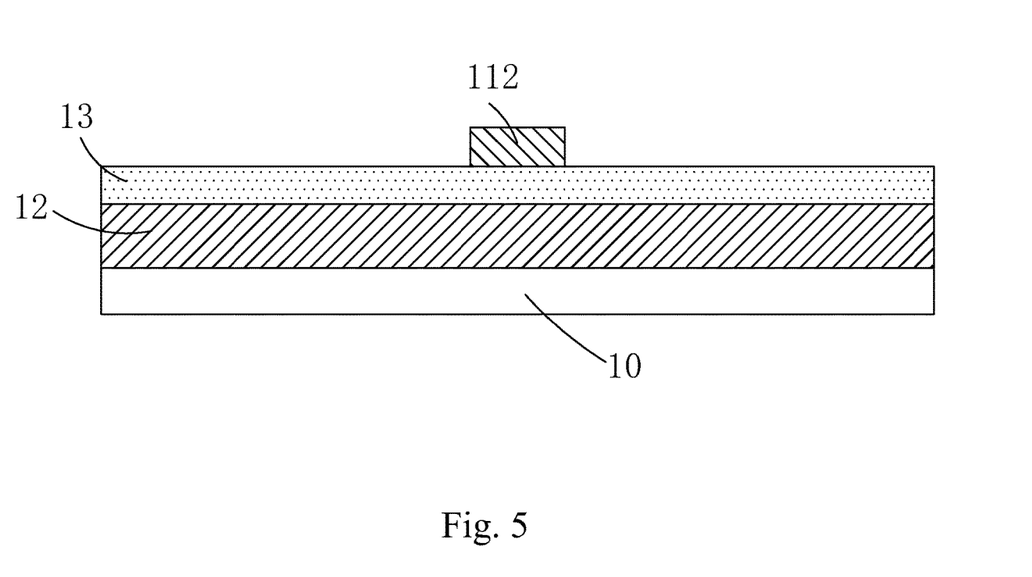
FIG. 5 is a sectional diagram of FIG. 4 along the A-A line.

Please refer to FIG. 4 combining FIG. 5. The present invention first provides a touch control electrode, comprising: a plurality of first electrodes 11 which are arranged in parallel with one another and extended along a horizontal direction, and a plurality of second electrodes 12 which are arranged in parallel with one another and extended along a vertical direction;
the plurality of first electrodes 11 and the plurality of second electrodes 12 are located in the same layer, and each of the first electrodes 11 are divided into a plurality of first sub electrodes 111 which are separated with one another by the plurality of second electrodes 12, and the first sub electrodes 111 which are adjacent on the same first electrode 11 are electrically connected with a bridging line 112 across the second electrode 12 between the two first sub electrodes 111;
the plurality of second electrodes 12 are covered with an insulation layer 13, and the bridging line 112 is insulated with the second electrode 12 by the insulation layer 13.

Significantly, the insulation layer 13 only covers on the second electrodes 12 in the present invention, which can increase a fringing field capacitance between the first electrode 11 and the second electrode 12. As a finger touches, a lateral capacitance variable and a fringing field capacitance variable are generated at the same time. In comparison with the insulation layer covering on the entire surface in prior art, the present invention additionally generates a fringing field capacitance variable, and the total capacitance variable is increased along with, and thus to promote the signal to noise ratio of the touch control panel, and the touch control result is better.

Specifically, referring to FIG. 4, each of the second electrodes 12 comprises a plurality of second sub electrodes 121 which are sequentially arranged in a vertical direction, and a plurality of connecting lines 122 seriesly connecting the respective second electrodes 121, and the second sub electrode 121 and the first sub electrode 111 are staggered, and the connecting line 122 and the bridging line 112 are insulated and crossed. The second electrodes 12 and the first sub electrode 111 are formed with the same patterning process.

Preferably, both shapes of the second sub electrode 121 and the first sub electrode 111 are rectangles.

Preferably, the second sub electrode 121, the first sub electrode 111, the bridging line 112 and the connecting line 122 are transparent. More preferably, the materials of the second sub electrode 121, the first sub electrode 111 and the connecting line 122 are ITO, and a material of the bridging line 112 is ITO or metal.

Specifically, the first electrode 11 is a driving electrode, and the second electrode 12 is a sensing electrode. Certainly according to the requirement, the technical solution that the first electrode 11 is a sensing electrode, and the second electrode 12 is a driving electrode also can be utilized, and the technical solution is not a restriction to the present invention.

Figure 1:
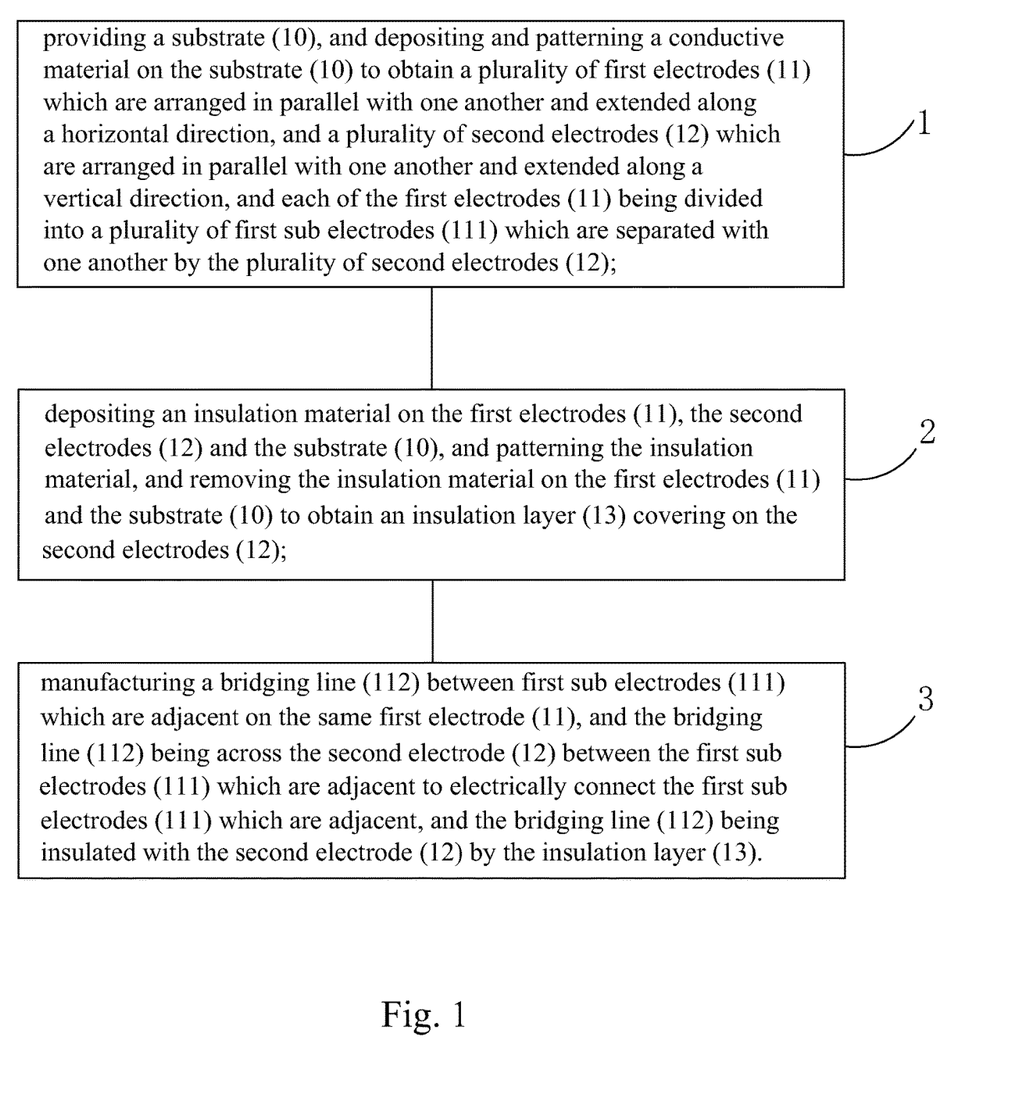
FIG. 1 is a flowchart of a manufacture method of a touch control electrode of the present invention.
Figure 2:
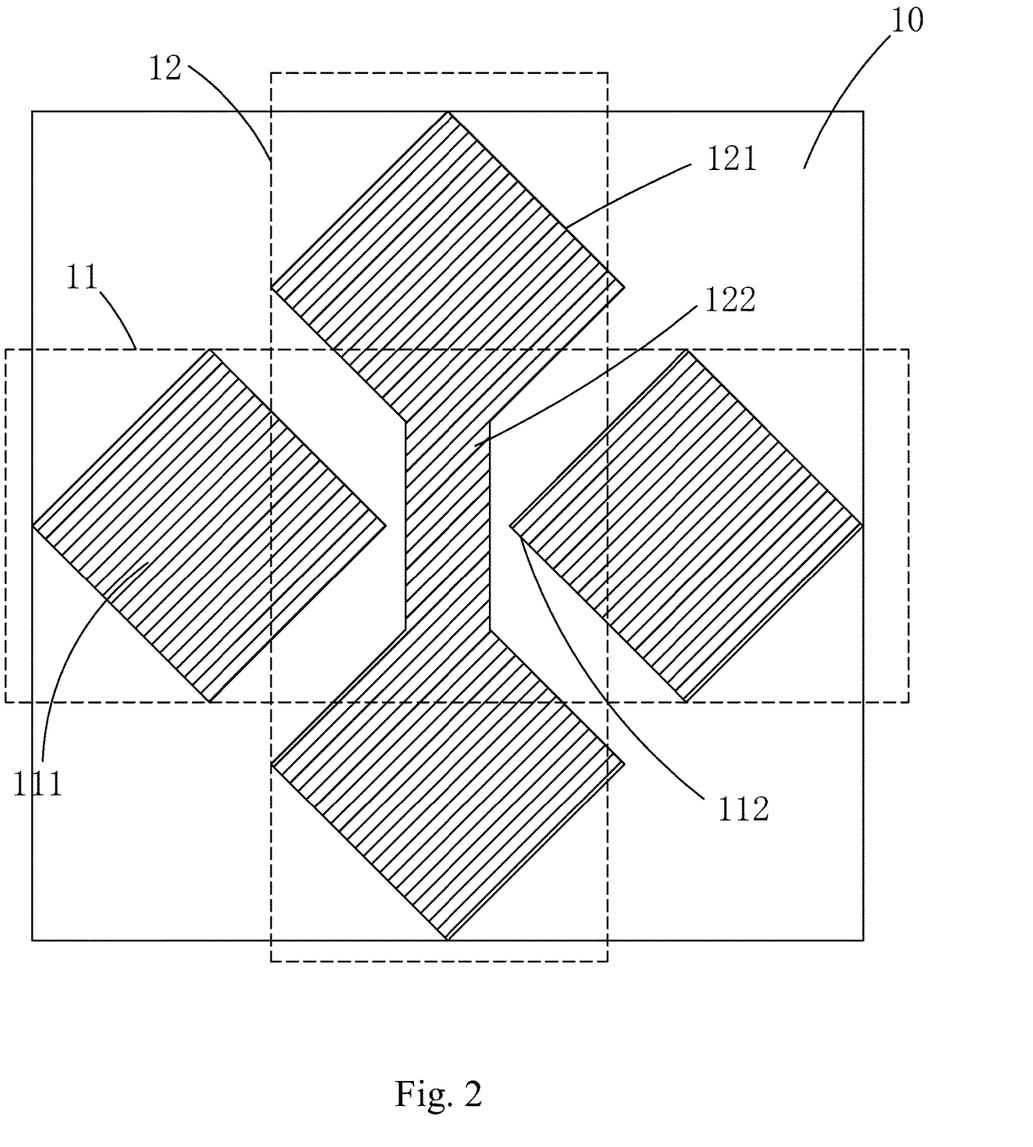
FIG. 2 is a diagram of step 1 of a manufacture method of a touch control electrode of the present invention.

Please refer to FIG. 1. The present invention further provides a manufacture method of a touch control electrode, comprising steps of:

step 1, referring to FIG. 2, providing a substrate 10, and depositing and patterning a conductive material on the substrate 10 to obtain a plurality of first electrodes 11 which are arranged in parallel with one another and extended along a horizontal direction, and a plurality of second electrodes 12 which are arranged in parallel with one another and extended along a vertical direction, and each of the first electrodes 11 being divided into a plurality of first sub electrodes 111 which are separated with one another by the plurality of second electrodes 12.

Figure 3:
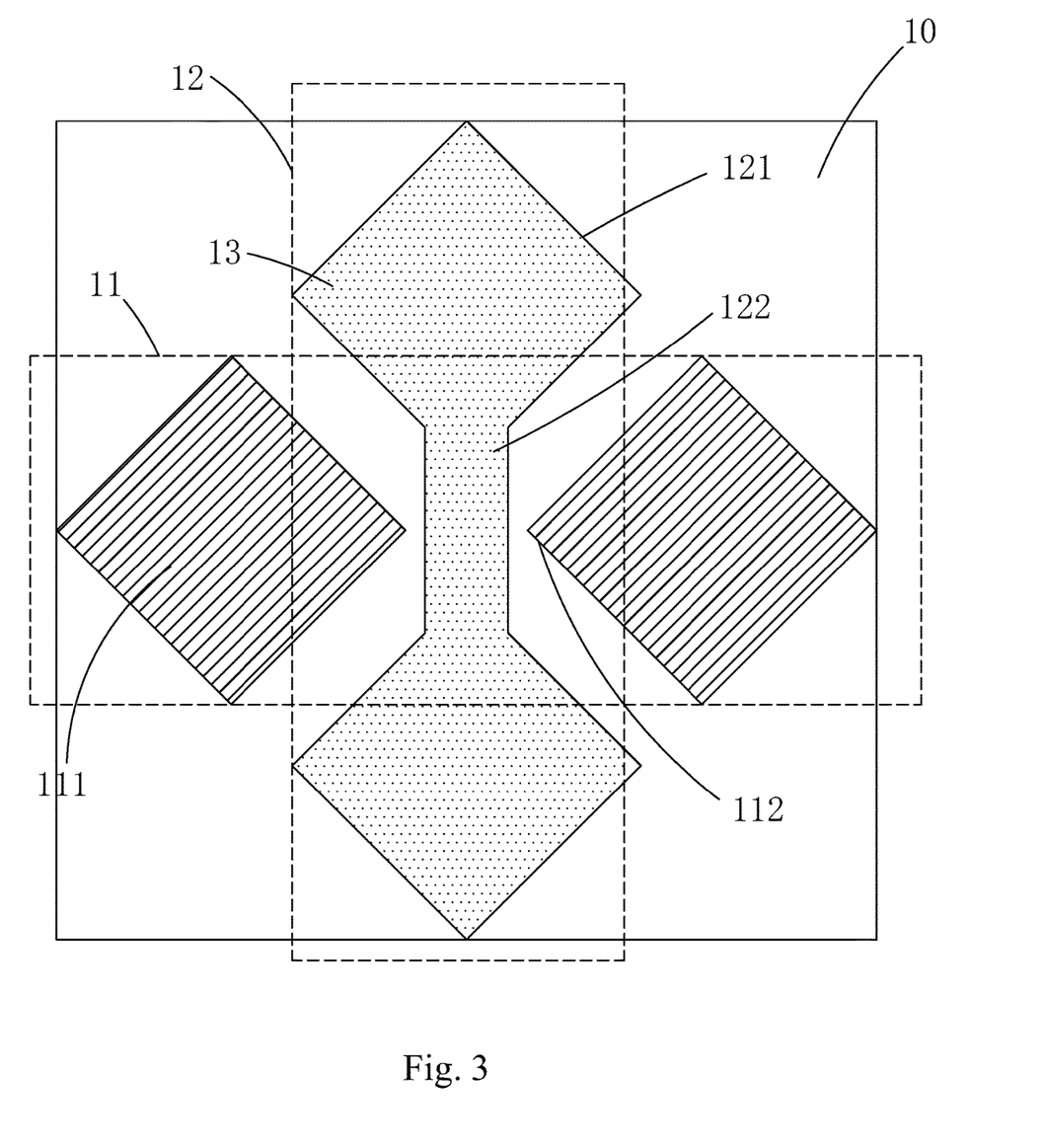
FIG. 3 is a diagram of step 2 of a manufacture method of a touch control electrode of the present invention.

Specifically, in step 1, the conductive material is deposited by Physical Vapor Deposition (PVD), and preferably, the conductive material is transparent, and more preferably, the conductive material is ITO.

step 2, referring to FIG. 3, depositing an insulation material on the first electrodes 11, the second electrodes 12 and the substrate 10, and patterning the insulation material, and removing the insulation material on the first electrodes 11 and the substrate 10 to obtain an insulation layer 13 covering on the second electrodes 12.

Specifically, the insulation material is silicon nitride (SiNx), and in step 2, the insulation material is deposited by Plasma Enhanced Chemical Vapor Deposition (PECVD), and the insulation material on the first electrode 11 and the substrate 10 is removed by dry etching.

step 3, referring to FIG. 4, manufacturing a bridging line 112 between first sub electrodes 111 which are adjacent on the same first electrode 11, and the bridging line 112 being across the second electrode 12 between the first sub electrodes 111 which are adjacent to electrically connect the first sub electrodes 111 which are adjacent, and the bridging line 112 being insulated with the second electrode 12 by the insulation layer 13.

Specifically, a material of the bridging line 112 is ITO or metal, and in step 3, the bridging line 112 is manufactured by PVD process.

Figure 6:
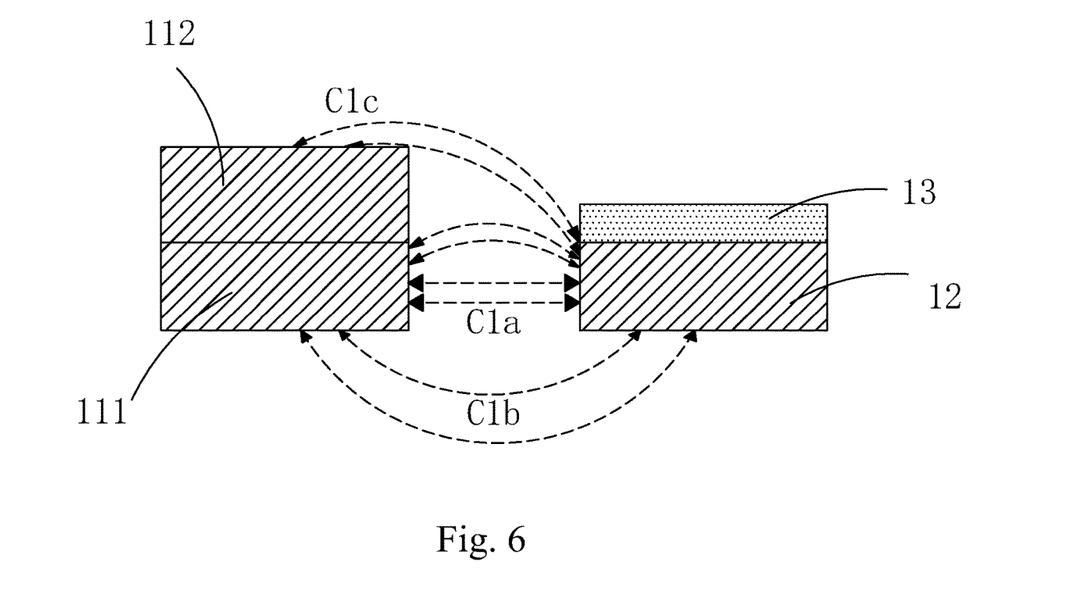
FIG. 6 is a electrical field line distribution diagram of the touch control electrode of the present invention as being touched by a non finger object.
Figure 7:
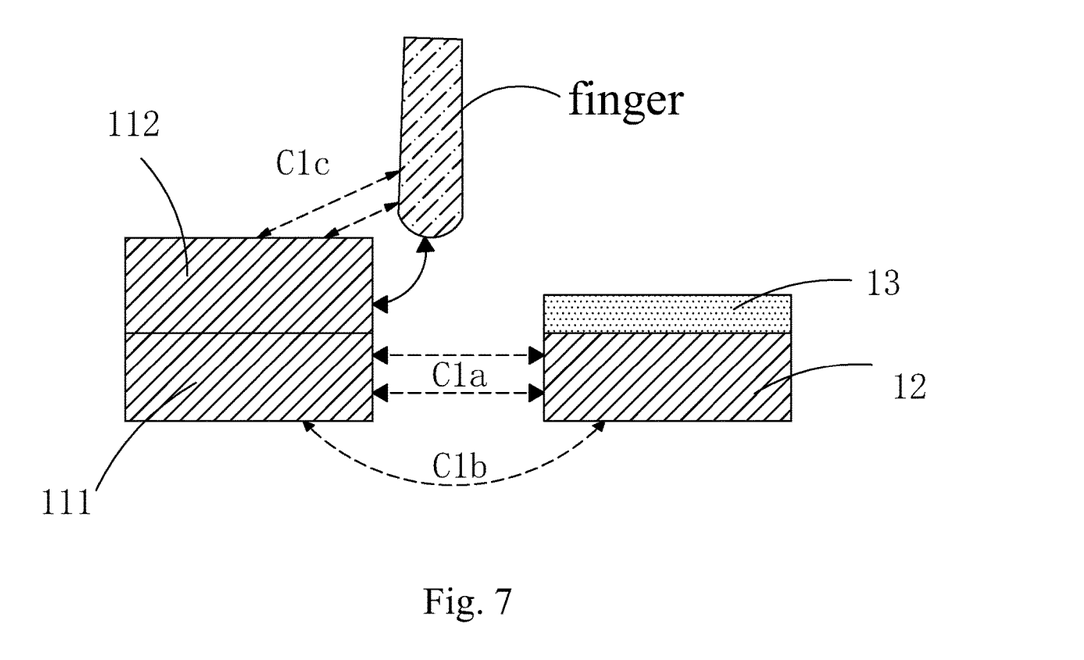
FIG. 7 is a electrical field line distribution diagram of the touch control electrode of the present invention as being touched by a finger.

Significantly, as shown in FIG. 6, the insulation layer 13 only covers on the second electrodes 12 in the present invention. The capacitances formed by the first electrode 11 and the second electrode 12 comprise: a parallel capacitance $C1a$, a lateral capacitance $C1b$ and a fringing field capacitance $C1c$. As shown in FIG. 7, the lateral capacitance $C1b$ and the fringing field capacitance $C1c$ will change to generate a lateral capacitance variable and a fringing field capacitance variable. In prior art, the insulation layer covers on the entire surface, and there is no fringing field capacitance $C1c$ generated between the first electrode 11 and the second electrode 12, and thus there is no fringing field capacitance variable generated as the finger touches. The present invention additionally generates a fringing field capacitance variable, and the total capacitance variable as the finger touches is increased along with, and thus to promote the signal to noise ratio of the touch control panel, and the touch control result is better.

Specifically, referring to FIG. 4, each of the second electrodes 12 comprises a plurality of second sub electrodes 121 which are sequentially arranged in a vertical direction, and a plurality of connecting lines 122 seriesly connecting the respective second electrodes 121, and the second sub electrode 121 and the first sub electrode 111 are staggered, and the connecting line 122 and the bridging line 112 are insulated and crossed. The second electrodes 12 and the first sub electrode 111 are formed with the same patterning process.

Preferably, both shapes of the second sub electrode 121 and the first sub electrode 111 are rectangles.

Specifically, the first electrode 11 is a driving electrode, and the second electrode 12 is a sensing electrode. Certainly according to the requirement, the technical solution that the first electrode 11 is a sensing electrode, and the second electrode 12 is a driving electrode also can be utilized, and the technical solution is not a restriction to the present invention.

In conclusion, the present invention provides a touch control electrode. Only the second electrode is covered with an insulation layer in the touch control electrode, and the first electrode is not covered with the insulation layer to ensure that a lateral capacitance variable and a fringing field capacitance variable are generated as being touched while the bridging line and the second electrode are insulated, and thus to increase the total capacitance variable as being touched, to promote the signal to noise ratio, and the touch result is better. The present invention further provides a manufacture method of a touch control electrode, which can promote the signal to noise ratio of the touch control panel, and improve the touch control result.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A touch control electrode, comprising: a plurality of first electrodes which are arranged in parallel with one another and extended along a horizontal direction, and a plurality of second electrodes which are arranged in parallel with one another and extended along a vertical direction;

the plurality of first electrodes and the plurality of second electrodes are located in the same layer, and each of the first electrodes are divided into a plurality of first sub electrodes which are separated with one another by the plurality of second electrodes, and the first sub electrodes which are adjacent on the same first electrode are electrically connected with a bridging line across the second electrode between the two first sub electrodes;

just the plurality of second electrodes are covered with an insulation layer, and the bridging line is insulated with the second electrode by the insulation layer.

2. The touch control electrode according to claim 1, wherein each of the second electrodes comprises a plurality of second sub electrodes which are sequentially arranged in a vertical direction, and a plurality of connecting lines seriesly connecting the respective second electrodes;

the second sub electrode and the first sub electrode are staggered, and the connecting line and the bridging line are insulated and crossed.

3. The touch control electrode according to claim 2, wherein both shapes of the second sub electrode and the first sub electrode are rectangles.

4. The touch control electrode according to claim 2, wherein materials of the second sub electrode, the first sub electrode, the bridging line and the connecting line are indium tin oxide.

5. The touch control electrode according to claim 1, wherein the first electrode is a driving electrode, and the second electrode is a sensing electrode.

6. A manufacture method of a touch control electrode, comprising steps of:

step 1, providing a substrate, and depositing and patterning a conductive material on the substrate to obtain a plurality of first electrodes which are arranged in parallel with one another and extended along a horizontal direction, and a plurality of second electrodes which are arranged in parallel with one another and extended along a vertical direction, and each of the first electrodes being divided into a plurality of first sub electrodes which are separated with one another by the plurality of second electrodes;

step 2, depositing an insulation material on the first electrodes, the second electrodes and the substrate, and patterning the insulation material, and removing the insulation material on the first electrodes and the substrate to obtain an insulation layer covering on the second electrodes;

step 3, manufacturing a bridging line between first sub electrodes which are adjacent on the same first electrode, and the bridging line being across the second electrode between the first sub electrodes which are adjacent to electrically connect the first sub electrodes which are adjacent, and the bridging line being insulated with the second electrode by the insulation layer.

7. The manufacture method of the touch control electrode according to claim 6, wherein each of the second electrodes comprises a plurality of second sub electrodes which are sequentially arranged in a vertical direction, and a plurality of connecting lines seriesly connecting the respective second electrodes;

the second sub electrode and the first sub electrode are staggered, and the connecting line and the bridging line are insulated and crossed.

8. The manufacture method of the touch control electrode according to claim 7, wherein both shapes of the second sub electrode and the first sub electrode are rectangles.

9. The manufacture method of the touch control electrode according to claim 7, wherein materials of the second sub electrode, the first sub electrode, the bridging line and the connecting line are indium tin oxide.

10. The manufacture method of the touch control electrode according to claim 6, wherein the first electrode is a driving electrode, and the second electrode is a sensing electrode.

11. A manufacture method of a touch control electrode, comprising steps of:

step 1, providing a substrate, and depositing and patterning a conductive material on the substrate to obtain a plurality of first electrodes which are arranged in parallel with one another and extended along a horizontal direction, and a plurality of second electrodes which are arranged in parallel with one another and extended along a vertical direction, and each of the first electrodes being divided into a plurality of first sub electrodes which are separated with one another by the plurality of second electrodes;

step 2, depositing an insulation material on the first electrodes, the second electrodes and the substrate, and patterning the insulation material, and removing the insulation material on the first electrodes and the substrate to obtain an insulation layer covering on the second electrodes;

step 3, manufacturing a bridging line between first sub electrodes which are adjacent on the same first electrode, and the bridging line being across the second electrode between the first sub electrodes which are adjacent to electrically connect the first sub electrodes which are adjacent, and the bridging line being insulated with the second electrode by the insulation layer;

wherein each of the second electrodes comprises a plurality of second sub electrodes which are sequentially arranged in a vertical direction, and a plurality of connecting lines seriesly connecting the respective second electrodes;

the second sub electrode and the first sub electrode are staggered, and the connecting line and the bridging line are insulated and crossed;

wherein the first electrode is a driving electrode, and the second electrode is a sensing electrode.

12. The manufacture method of the touch control electrode according to claim 11, wherein both shapes of the second sub electrode and the first sub electrode are rectangles.

13. The manufacture method of the touch control electrode according to claim 11, wherein materials of the second sub electrode, the first sub electrode, the bridging line and the connecting line are indium tin oxide.

* * * * *